United States Patent [19]

Besecke et al.

[11] Patent Number: 5,354,814
[45] Date of Patent: Oct. 11, 1994

[54] POLYMETHACRYLIMIDES HAVING A HIGH HEAT RESISTANCE

[75] Inventors: Siegmund Besecke, Hameln; Andreas Deckers, Ludwigshafen; Harald Lauke, Mannheim, all of Fed. Rep. of Germany

[73] Assignee: BASF Aktiengesellschaft, Ludwigshafen, Fed. Rep. of Germany

[21] Appl. No.: 82,580

[22] Filed: Jun. 28, 1993

[30] Foreign Application Priority Data

Jul. 2, 1992 [DE] Fed. Rep. of Germany ....... 4221712

[51] Int. Cl.$^5$ .................. C08F 222/10; C08F 222/04
[52] U.S. Cl. .................. 525/326.8; 525/327.6; 525/327.2; 525/379
[58] Field of Search ............... 525/326.8, 327.6, 327.2, 525/379

[56] References Cited

U.S. PATENT DOCUMENTS

| | | | |
|---|---|---|---|
| 4,012,572 | 3/1977 | Dean et al. | 526/50 |
| 4,246,374 | 1/1981 | Konchik | 525/329 |
| 4,252,701 | 2/1981 | Miyaguchi et al. | 260/23.7 |
| 4,495,339 | 1/1985 | Lauver | 526/262 |

FOREIGN PATENT DOCUMENTS 440583  8/1991  European Pat. Off. .

OTHER PUBLICATIONS

Derwent Abstract, JP 01/311,112 Chem. Rev. 1980, 63–97.
Patent Abstracts of Japan, vol. 11, No. 132 (C–417) Apr. 24, 1987 (English abstract of JP 61 266 409).

*Primary Examiner*—Mark Nagumo
*Attorney, Agent, or Firm*—Keil & Weinkauf

[57] ABSTRACT

Copolymers obtainable by
(I) copolymerizing a monomer mixture comprising
(A) 1 to 98% by weight of a monomer of the formula I

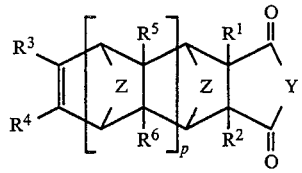

where:
$R^1$ to $R^6$ are hydrogen, $C_1-C_{10}$-alkyl, $C_1-C_{10}$-alkoxy, it being possible in the alkyl or alkoxy radicals having more than one carbon atom for an oxygen atom to be inserted in each case between two carbon atoms, $C_5-C_8$-cycloalkyl, unsubstituted or substituted $C_6-C_{10}$-aryl, $C_6-C_{10}$-aryl-$C_1-C_{10}$-alkyl, $C_6-C_{10}$-aryloxy, cyano, halogen, —CO—O—$R^7$, —O—CO—$R^7$ or —CO—NR$^7$R$^8$, where
$R^7$ and $R^8$ are hydrogen, $C_1-C_{10}$-alkyl, $C_5-C_8$-cycloalkyl, unsubstituted or substituted $C_6-C_{10}$-aryl or $C_6-C_{10}$-aryl-$C_1-C_{10}$-alkyl;
p is 0, 1 or 2;
Z is —CH$_2$—, oxygen or sulfur;
Y is oxygen or —N—$R^9$, where
$R^9$ is hydrogen, $C_1-C_{22}$-alkyl, $C_5-C_{12}$-cycloalkyl, unsubstituted or substituted $C_6-C_{10}$-aryl or $C_6-C_{10}$-aryl-$C_1-C_{10}$-alkyl;
(B) 1 to 98% by weight of a compound selected from the group comprising acrylic and methacrylic acid and esters thereof,
(C) 0 to 98% by weight of a further monomer, and
(II) reacting the thus obtained copolymers with a primary amine and also a process for preparing these copolymers, the use thereof for producing molded articles, and also molded articles produced from these polymers, and homopolymers and copolymers as intermediates.

3 Claims, No Drawings

POLYMETHACRYLIMIDES HAVING A HIGH HEAT RESISTANCE

Copolymers obtainable by
(I) copolymerizing a monomer mixture comprising
  (A) 1 to 98% by weight of a monomer of the formula I

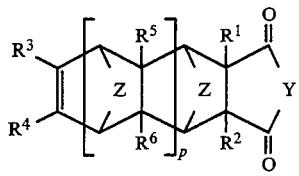          I where:
  $R^1$ to $R^6$ are hydrogen, $C_1$-$C_{10}$-alkyl, $C_1$-$C_{10}$-alkoxy, it being possible in the alkyl or alkoxy radicals having more than one carbon atom for an oxygen atom to be inserted in each case between two carbon atoms, $C_5$-$C_8$-cycloalkyl, $C_6$-$C_{10}$-aryl, $C_6$-$C_{10}$-aryl-$C_1$-$C_{10}$-alkyl, $C_6$-$C_{10}$-aryloxy, the aryl groups being able to carry up to three $C_1$-$C_{10}$-alkyl groups, cyano, halogen, —CO—O—$R^7$, —O—CO—$R^7$ or —CO—$NR^7R^8$, where
  $R^7$ and $R^8$ are hydrogen, $C_1$-$C_{10}$-alkyl, $C_5$-$C_8$-cycloalkyl, $C_6$-$C_{10}$-aryl or $C_6$-$C_{10}$-aryl-$C_1$-$C_{10}$-alkyl, the aryl groups being able to carry up to three $C_1$-$C_{10}$-alkyl groups;
  p is 0, 1 or 2;
  Z is —$CH_2$—, oxygen or sulfur, the radicals Z being identical or different in the case p>0;
  Y is oxygen or —N—$R^9$, where
    $R^9$ is hydrogen, $C_1$-$C_{22}$-alkyl, $C_5$-$C_{12}$-cycloalkyl, $C_6$-$C_{10}$-aryl or $C_6$-$C_{10}$-aryl-$C_1$-$C_{10}$-alkyl, it being possible for these radicals, with the exception of hydrogen and $C_1$-$C_{22}$-alkyl, to be mono- to trisubstituted by radicals selected from the group comprising $C_1$-$C_4$-alkyl, $C_1$-$C_4$-alkoxy and halogen;
  (B) 1 to 98% by weight of at least one compound selected from the group comprising acrylic and methacrylic acid and esters of the acrylic and methacrylic acid of the formula II

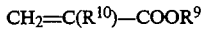          II where $R^{10}$ is hydrogen or methyl, and
  (C) 0 to 98% by weight of at least one further copolymerizable monomer,
and
(II) reacting the thus obtained copolymer with a compound of the formula III

          III where $R^{11}$ is hydrogen, $C_1$-$C_{22}$-alkyl, $C_5$-$C_8$-cycloalkyl, $C_6$-$C_{10}$-aryl or $C_6$-$C_{10}$-aryl-$C_1$-$C_4$-alkyl, it being possible for these radicals, with the exception of hydrogen and the $C_1$-$C_{22}$-alkyl radicals, to be mono- to trisubstituted by radicals selected from the group comprising $C_1$-$C_4$-alkyl, $C_1$-$C_4$-alkoxy and halogen, or a mixture thereof.

The invention also relates to a process for preparing these copolymers, to the use thereof for producing molded articles, films or fibers, and also to molded articles, films or fibers produced from these polymers.

The invention furthermore relates to homopolymers and random copolymers, to a process for their preparation, to the use thereof for producing molded articles, films or fibers, and also to molded articles, films or fibers produced from these polymers.

Thermoplastic molding materials based on polymethyl methacrylate (PMMA) generally have high transparency combined with very good weathering resistance. However, in many applications it is additionally desirable that PMMA molding materials also have high heat resistance. Some of the most common methods of increasing the heat resistance comprise copolymerizing methyl methacrylate (MMA) with, for example, alphamethylstyrene, maleic anhydride, or methacrylamides substituted on the nitrogen atom. However, this generally yields products having reduced weathering resistance, an undesirable inherent color, and low thermal stability.

A further possible way of raising the glass transition temperature of thermoplastic molding materials based on PMMA is the polymer-like reaction of PMMA with primary amines (imidation) with the formation of glutarimide structures such as the following

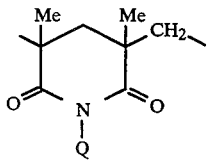

The glass transition temperature of such imidated PMMA molding materials depends on the proportion of glutarimide units (degree of imidation) in the polymer and also on the substituent Q on the imide nitrogen atom.

When PMMA is completely imidated very high glass transition temperatures can be reached in the case where Q is hydrogen. However, water absorption increases, which is a disadvantage, and the flowability of such molding materials is excessively reduced. Although these disadvantages can be overcome by other radicals Q such as methyl or cyclohexyl, this is at the expense of the heat resistance. Although high glass transition temperatures can be achieved by aromatic radicals Q such as phenyl, the disadvantage here is that the weathering resistance is too low and stress cracking is increased.

U.S. Pat. No. 4,246,374 describes a process for reacting various copolymers obtainable by copolymerizing MMA with comonomers such as styrene, alpha-methylstyrene, (meth)acrylonitrile, maleic anhydride, N-alkylmaleimide, ethylene and propylene, with amines in an extruder (melt process). However, the imidated copolymers prepared in this way do not have sufficiently high heat resistance.

U.S. Pat. No. 4,012,572 describes how the heat resistance of PMMA molding materials can be raised by copolymerizing MMA with norbornene derivatives.

Furthermore, polymers are known from JP-A 01,311,112 that can be obtained by copolymerizing 7-oxabicyclo[2.2.1]hept-5-ene-2,3-dicarboximides (formula IV)

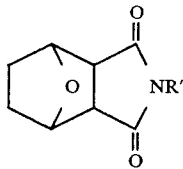　　　　　　　　　　IV with further comonomers. However, these polymers do not have sufficiently high heat resistance.

It is an object of the present invention to provide transparent, thermoplastically processible molding materials having high heat resistance.

We have found that this object is achieved with the copolymers defined at the beginning.

We have also found a process for preparing these copolymers, the use thereof for producing molded articles, films and fibers, as well as molded articles, films and fibers produced therefrom.

We have also found homopolymers and copolymers used for producing the copolymers defined at the beginning, a process for their preparation, the use thereof for producing molded articles, films and fibers, and also molded articles, films and fibers produced therefrom.

As component A), according to the invention 1 to 98% by weight, preferably 5 to 50% by weight of at least one monomer I is used.

The monomers I are known per se or can be obtained in a known manner, for example by Diels-Alder reactions of appropriately substituted dienes such as cyclopentadiene, thiophene, furan or methylcyclopentadiene, and dienophilic compounds such maleic anhydride (MA) or substituted maleimides (MI). In the case of polarnuclear compounds I, the dienophilic compound is generally an adduct prepared from MA and/or MI and one of the abovementioned dienes.

The reaction conditions for the preparation of the respective monomers I generally correspond to those normally employed in Diels-Alder chemistry. An overview of these various reaction conditions is given for example by G. Brieger, J. N. Bennett: Chem. Rev. 80 (1980) 63 and A. Wasserman: Diels-Alder Reactions, American Elsevier, New York (1965).

For example, compounds of the type I where p=0 are obtained by reacting the appropriately substituted maleic acid derivatives such as maleic anhydride and maleimide or their derivatives, with cyclopentadiene, furan or thiophene or their derivatives, according to methods known per se. The cycloaddition can be initiated thermally or photochemically.

Monomers of the type I where p=1 and 2 may be prepared by further similar reaction of the thus obtained tricyclic compounds with further dienes such as those mentioned above.

Suitable monomers I are in particular the unsubstituted parent compounds in which $R^1$ is hydrogen. Suitable monomers of this class are furthermore the compounds according to the definition, which in the case where p=0 may contain up to four, where p=1 up to six, and where p=2 up to eight substituents ($R^1$–$R^6$). As substituents $R^1$–$R^6$, which may be identical or different, there may be mentioned:

hydrogen;

$C_1$–$C_{10}$-alkyl such as methyl, ethyl, n-propyl, i-propyl, n-butyl, sec-butyl, i-butyl, tert-butyl, n-pentyl, i-pentyl, sec-pentyl, tert-pentyl, neopentyl, n-hexyl, n-heptyl, n-octyl, n-nonyl and n-decyl, particularly preferably $C_1$–$C_4$-alkyl such as methyl, ethyl, n-propyl, i-propyl, n-butyl, i-butyl, sec-butyl and tert-butyl, it being possible in chains comprising at least two carbon atoms for an oxygen atom in each case to be inserted between two carbon atoms, such as —$CH_2$—O—$CH_3$, —$CH_2$—O—$CH_2$—O—$CH_3$, particularly preferably —$CH_2$—O—$CH_3$;

$C_1$–$C_{10}$-alkoxy such as methoxy, ethoxy, n-propoxy, i-propoxy, n-butoxy, sec-butoxy, i-butoxy, tert-butoxy, n-pentoxy, i-pentoxy, sec-pentoxy, tert-pentoxy, neopentoxy, n-hexoxy, n-heptoxy, n-octoxy, n-nonoxy and n-decoxy, particularly preferably $C_1$–$C_4$-alkoxy such as methoxy, ethoxy, n-propoxy, i-propoxy, n-butoxy, i-butoxy, sec-butoxy and tert-butoxy, it being possible in chains comprising at least two carbon atoms for an oxygen atom in each case to be inserted between two carbon atoms, such as —O—$CH_2$—O—$CH_3$, —O—$CH_2$—O—$CH_2$—O—$CH_3$, —O—$CH_2CH_2$—O—$CH_3$, particularly preferably —O—$CH_2$—O—$CH_3$;

$C_5$–$C_8$-cycloalkyl such as cyclopentyl, cyclohexyl, cycloheptyl and cyclooctyl;

$C_6$–$C_{10}$-aryl such as phenyl and naphthyl, preference being given to phenyl, the aryl radicals being able to carry up to three $C_1$–$C_{10}$-alkyl groups, preferably tolyl;

$C_6$–$C_{10}$-aryl-$C_1$–$C_{10}$-alkyl, preferably phenyl-$C_1$–$C_4$-alkyl such as benzyl, 2-phenylethyl, 3-phenylpropyl and, 4-phenylbutyl, particularly preferably benzyl, 2-phenylethyl and, 3-phenylpropyl, the aryl groups being able to carry up to three $C_1$–$C_{10}$-alkyl groups, preferably 4-methylbenzyl;

$C_6$–$C_{10}$-aryloxy such as phenoxy and naphthyloxy, preferably phenoxy, the aryloxy radicals being able to carry up to three $C_1$–$C_{10}$-alkyl groups, preferably tolyloxy; cyano; halogen, such as chlorine or bromine.

In addition, the substituents $R^1$–$R^6$ may be acid, ester or amide groups of the formulae —CO—O—$R^7$, —O—CO—$R^7$ or —CO—$NR^7R^8$, where $R^7$ and $R^8$ may be identical or different and can have the following meanings:

hydrogen;

$C_1$–$C_{10}$-alkyl such as methyl, ethyl, n-propyl, i-propyl, n-butyl, sec-butyl, i-butyl, tert-butyl, n-pentyl, i-pentyl, sec-pentyl, tert-pentyl, neopentyl, n-hexyl, n-heptyl, n-octyl, n-nonyl or n-decyl, particularly preferably $C_1$–$C_4$-alkyl such as methyl, ethyl, n-propyl, i-propyl, n-butyl, i-butyl, sec-butyl or tert-butyl;

$C_5$–$C_8$-cycloalkyl such as cyclopentyl, cyclohexyl, cycloheptyl or cyclooctyl;

$C_6$–$C_{10}$-aryl such as phenyl, naphthyl, preference being given to phenyl, the aryl radicals being able to carry up to three $C_1$–$C_{10}$-alkyl groups, preferably tolyl;

$C_6$–$C_{10}$-aryl-$C_1$–$C_{10}$-alkyl, preferably phenyl-$C_1$–$C_4$-alkyl such as benzyl, 2-phenylethyl, 3-phenylpropyl or 4-phenylbutyl, particularly preferably benzyl, 2-phenylethyl or 3-phenylpropyl, the aryl groups being able to carry up to three $C_1$–$C_{10}$-alkyl groups, preferably 4-methylbenzyl;

p is 0, 1 or 2, preferably 0;

Z may be —$CH_2$—, oxygen or sulfur, preference being given to —$CH_2$— and oxygen; in the case p>0 the radicals Z may be identical or different;

Y is oxygen or the —N—R$^9$ group, where R$^9$ has the following meanings:
hydrogen;
C$_1$–C$_{22}$-alkyl, preferably C$_1$–C$_{12}$-alkyl such as methyl, ethyl, n-propyl, i-propyl, n-butyl, sec-butyl, i-butyl, tertbutyl, n-pentyl, i-pentyl, sec-pentyl, tert-pentyl, neopentyl, n-hexyl, n-heptyl, n-octyl, n-nonyl, n-decyl, n-undecyl, n-dodecyl and stearyl, particularly preferably C$_1$–C$_4$-alkyl such as methyl, ethyl, n-propyl, i-propyl, n-butyl, i-butyl, sec-butyl or tert-butyl; C$_5$–C$_{12}$-cycloalkyl such as cyclopentyl, cyclohexyl, cycloheptyl, cyclooctyl, cyclononyl, cyclodecyl, cycloundecyl or cyclododecyl, preference being given to cyclopentyl and cyclohexyl, it being possible for these radicals to be mono- to trisubstituted by radicals selected from the group C$_1$–C$_4$-alkyl, C$_1$–C$_4$-alkoxy and halogen such as fluorine, chlorine or bromine, such as 4-methylcyclohexyl, 4-methoxycyclohexyl, or 2,4,6-trimethylcyclohexyl;

C$_6$–C$_{10}$-aryl such as phenyl or naphthyl, preference being given to phenyl, it being possible for these radicals to be mono- to trisubstituted by radicals selected from the group C$_1$–C$_4$-alkyl, C$_1$–C$_4$-alkoxy and halogen such as fluorine, chlorine or bromine, such as tolyl;

C$_6$–C$_{10}$-aryl-C$_1$–C$_{10}$-alkyl, preferably phenyl-C$_1$–C$_4$-alkyl such as benzyl, 2-phenylethyl, 3-phenylpropyl or 4-phenylbutyl, particularly preferably benzyl, 2-phenylethyl or 3-phenylpropyl, it being possible for these aryl radicals to be mono- to trisubstituted by radicals selected from the group C$_1$–C$_4$-alkyl, C$_1$–C$_4$-alkoxy and halogen such as fluorine, chlorine, or bromine, preferably 4-methylbenzyl.

As examples of the monomers I the following may be mentioned:
bicyclo[2.2.1]hept-2-ene-5,6-dicarboxylic anhydride,
bicyclo[2.2.1]hept-2-ene-5,6-dicarboxamide,
N-methylbicyclo[2.2.1]hept-2-ene-5,6-dicarboxamide,
N-phenylbicyclo[2.2.1]hept-2-ene-5,6-dicarboxamide,
N-cyclohexylbicyclo[2.2.1]hept-2-ene-5,6-dicarboxamide,
7-oxabicyclo[2.2.1]hept-2-ene-5,6-dicarboxylic anhydride,
1-methyl-7-oxabicyclo[2.2.1]hept-2-ene-5,6-dicarboxylic anhydride,
1,4-dimethyl-7-oxabicyclo[2.2.1]hept-2-ene-5,6-dicarboxylic anhydride,
1,4-diethyl-7-oxabicyclo[2.2.1]hept-2-ene-5,6-dicarboxylic anhydride,
1-methoxy-7-oxabicyclo[2.2.1]hept-2-ene-5,6-dicarboxylic anhydride,
1-methoxy-4-methyl-7-oxabicyclo[2.2.1]hept-2-ene-5,6-dicarboxylic anhydride,
1-phenyl-7-oxabicyclo[2.2.1]hept-2-ene-5,6-dicarboxylic anhydride,
1-phenoxy-7-oxabicyclo[2.2.1]hept-2-ene-5,6-dicarboxylic anhydride,
1-benzyl-7-oxabicyclo[2.2.1]hept-2-ene-5,6-dicarboxylic anhydride,
2-chloro-7-oxabicyclo[2.2.1]hept-2-ene-5,6-dicarboxylic anhydride,
1-acetyl-7-oxabicyclo[2.2.1]hept-2-ene-5,6-dicarboxylic anhydride,
7-oxabicyclo[2.2.1]hept-2-ene-5,6-dicarboxamide,
N-methyl-7-oxabicyclo[2.2.1]hept-2-ene-5,6-dicarboxamide,
N-phenyl-7-oxabicyclo[2.2.1]hept-2-ene-5,6-dicarboxamide,
N-cyclohexyl-7-oxabicyclo[2.2.1]hept-2-ene-5,6-dicarboxamide.

It goes without saying that mixtures of various of the aforementioned monomers I may also be used. Likewise, stereochemically uniform isomers and also mixtures of different stereoisomers can be used.

The monomers I or mixtures thereof are copolymerized according to the invention with the monomers II, if desired together with at least one further copolymerizable monomer. The monomer mixture to be polymerized comprises 1 to 98% by weight, preferably 5 to 50% by weight of the monomer I, 1 to 98% by weight, preferably 50 to 95% by weight of the monomer II, and 0 to 98% by weight, preferably 0 to 40% by weight, of at least one further monomer copolymerizable therewith.

The monomers I or mixtures thereof may however also be converted to homopolymers and if desired provided with the additives and processing auxiliaries listed hereinafter, and further converted into thermoplastic molding materials by known methods, for example injection molding or extrusion methods.

As component (B) (monomer II) of the monomer mixture, there is used according to the invention at least one compound selected from the group comprising acrylic and methacrylic acid and esters of the acrylic and methacrylic acid of the formula

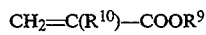

$$CH_2=C(R^{10})—COOR^9 \qquad II$$

in which R$^{10}$ is hydrogen or methyl. Preference is given to the C$_1$–C$_{12}$-alkyl esters, in particular C$_1$–C$_4$-alkyl esters such as methyl acrylate, ethyl acrylate, propyl acrylate, n-butyl acrylate, tert-butyl acrylate 2-ethylhexyl acrylate, lauryl acrylate, methyl methacrylate, ethyl methacrylate, propyl methacrylate, n-butyl methacrylate, tert-butyl methacrylate and 2-ethylhexyl methacrylate, in particular methyl methacrylate, phenyl acrylate, phenyl methacrylate, benzyl acrylate, benzyl methacrylate, 2-phenylethyl acrylate, 2-phenylethyl methacrylate, 3-phenylpropyl acrylate, 3-phenylpropyl methacrylate.

Furthermore, there may be added to the monomer mixture as component (C) 0 to 98% by weight, preferably 0 to 40% by weight, of further free-radical-copolymerizable monomers.

Examples of such monomers are:
acrylonitrile and methacrylonitrile,
acrylamide and methacrylamide, and also their N-alkyl and N,N-dialkyl derivatives containing C$_1$–C$_{20}$-alkyl groups, vinyl and vinylidene esters of aliphatic C$_2$–C$_8$-carboxylic acids such as vinyl acetate,
vinyl halides and vinylidene halides such as vinyl chloride and vinylidene chloride,
aromatic vinyl monomers such as styrene and alphamethylstyrene and also their mononuclear or polynuclear substituted derivatives, for example 2-, 3-, 4-methyl styrene, 2-, 3-, 4-ethylstyrene, 2-, 3-, 4-isopropylstyrene, 4-tert-butylstyrene, 3,4-dimethylstyrene, 2-, 4-chlorostyrene, 2-, 4-bromostyrene, 3,4-dichlorostyrene, vinyltoluene, alpha-chlorostyrene, particularly preferred being styrene,
maleic anhydride,
maleic, fumaric and itaconic acid C$_1$–C$_{10}$-alkyl esters, maleimide, fumaramide and itaconamide and also their N-alkyl and N,N-dialkyl derivatives containing $C_1$–$C_{10}$ alkyl groups,
and also mixtures thereof.

The copolymers according to the invention are generally prepared in a manner known per se, for example by bulk polymerization or solution polymerization.

Oil-soluble initiators (free-radical initiators such as diacyl peroxides, peresters such as pivalic peracid tert-butyl ester, peroxide dicarbonates, hydroperoxides, dialkyl-peroxides such as dilauryl peroxide, or azo compounds such as azobisisobutyronitrile) may be used in the preparation by bulk polymerization, and are generally employed in amounts of 0.01 to 5, preferably 0.05 to 2% by weight, based on the monomer mixture.

The polymerization temperature is generally from 20° to 200° C., preferably from 50° to 160° C.

The molecular weight can be regulated by suitable chain transfer agents such as commercially available mercaptans or by a suitable temperature regime. In general, molecular weights are selected to be from 30,000 to 250,000, preferably from 80,000 to 180,000 g/mol (weight average values of the molecular weight).

The copolymers may also be prepared by solution polymerization. Suitable solvents are for example toluene, xylene, acetone, ethyl acetate and tetrahydrofuran. Otherwise, the polymerization can be carried out under the conditions described for the bulk polymerization.

Further details may be found for example in Houben-Weyl, Methoden der organischen Chemie, Vol. 14/1.

As imidation reagents III, $R^{11}NH_2$, ammonia or primary amines may be used, these being selected from the group comprising: $C_1$–$C_{22}$-alkylamines, $C_5$–$C_8$-cycloalkylamines, $C_6$–$C_{10}$-arylamines and $C_6$–$C_{10}$-aryl-$C_1$–$C_4$-alkylamines, it being possible for the cycloalkylamines, arylamines and aralkylamines to be mono- to trisubstituted by radicals selected from the group comprising $C_1$–$C_4$-alkyl $C_1$–$C_4$-alkoxy and halogen such as fluorine, chlorine and bromine.

As examples there may be mentioned methylamine, ethylamine, n-propylamine, i-propylamine, n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, aniline, 2-, 4-methylaniline, 2-, 4-methoxyaniline, 2-, 4-chloroaniline, 2-, 4-bromoaniline, benzylamine, phenethylamine and phenylpropylamine, particularly preferably cyclohexylamine.

In a preferred embodiment the alcohol formed by aminolysis of the ester groups is removed from the reaction mixture. This can be achieved particularly advantageously by continuously distilling off the alcohol. For this purpose it is expedient to use for the imidation an amine that has a higher boiling point than the alcohol to be removed from the reaction mixture, so that no amine or only insignificant amounts of amine are removed at the same time.

Amines having the same or a lower boiling point than that of the alcohol to be distilled off may in principle also be used, in which case the amine that is removed at the same time is separated from the alcohol, for example by further distillation, and is returned to the reaction mixture. However, the variant proposed here (boiling point of the amine>boiling point of the alcohol) is preferred since it is easier to control the reaction.

The reaction is generally carried out by heating a mixture comprising the copolymer (I) and amine to the boiling point, preferably in a solvent with the exclusion of oxygen, and continuously distilling off the alcohol formed during the reaction from the reaction mixture.

The amine may be added directly at the beginning of the reaction or may for example be added continuously in proportion to its consumption.

The weight ratio of amine used to acrylate polymer is selected to be in the range from 1:1 to 400:1, preferably from 1:1 to 200:1.

As solvent, there may in principle be used all aprotic, polar solvents such as
N,N'-disubstituted, cyclic or acyclic carboxamides such as dimethylformamide, diethylformamide, dimethylacetamide, diethylacetamide,
N-methyl-2-pyrrolidone and N-ethyl-2-pyrrolidone and N,N,N',N'-tetrasubstituted, cyclic or acyclic ureas such as tetramethylurea,
N-substituted, cyclic or acyclic (poly)amines such as dicyclohexylmethylamine, dimethylcyclohexylamine, N,N,N',N'-tetramethylethylenediamine and N,N,N'N'-tetramethylhexamethylenediamine,
high boiling point ethers such as ethylene glycol dimethyl ether diethylene glycol dimethyl ether and
alkylene carbonates such as ethylene carbonate and propylene carbonate and also other conventional aprotic and polar solvents such as hexamethylphosphoric triamide, nitroalkanes such as nitromethane, dimethyl sulfoxide, diphenyl sulfoxide and sulfolane, preference being given to N-methylpyrrolidone.

The weight ratio of solvent used to polymer is generally from 1:1 to 100:1, preferably from 1:1 to 10:1.

The reaction temperature is generally selected to be from 100° to 280° C., preferably from 120° to 220° C. The reaction pressure is generally not critical, the reaction being generally carried out at from 80 to 250 kPa, preferably at atmospheric pressure.

The pH is generally above 7, on account of the amine used.

The reaction generally takes from 1 to 20 hours, preferably 1 to 10 hours.

Also, catalysts may be added to the reaction mixture in amounts of from 0.01 to 10% by weight, preferably from 0.05 to 2% by weight, based on the polymer used, to accelerate the reaction.

Examples of catalysts that may be used are tertiary amines such as tricyclohexylamine;
substituted guanidines such as 1,1,3,3-tetramethylguanidine and 1,3-diphenylguanidine;
tetrasubstituted alkyl ammonium compounds such as trimethylstearyl ammonium chloride;
organotitanium compounds such as titanium tetrapropoxide and titanium tetrabutoxide;
organotin compounds such as dibutyltin oxide and dibutyltin didodecanate;
aromatic amines and imides such as quinoline, isoquinoline, 4-benzylpyridine, 4-phenylpyridine, 2-hydroxypyridine, 1,3-, 1,4 and 2,3-benzodiazine, 2,2'- 2 3'- and 2,4'-bipyridyl;
imides such as N,N'-dicyclohexylcarbodiimide;
and also antimony trioxide, tin dioxide, sodium amide, sodium and potassium alcoholates such as sodium and potassium ethanolate, ammonium chloride and ammonium iodide.

The copolymers according to the invention and the molded articles, films or fibers produced therefrom may contain conventional additives and processing auxiliaries. The latter is generally present in a proportion of from 1 to 40% by weight, based on the total weight of the copolymers.

Conventional additives are for example stabilizers and oxidation retardants, heat and UV stabilizers, lubricants and mold release agents, dyes, pigments, plasticizers, antistatics and flameproofing agents.

Oxidation retardants and heat stabilizers which may be added to the thermoplastic materials according to the invention are for example sterically hindered phenols, hydroquinones, phosphites and derivatives and substituted members of this group and mixtures of these compounds, preferably in concentrations of up to 1% by weight, based on the weight of the mixture.

Examples of UV stabilizers are substituted resorcinols, salicylates, benzotriazoles and benzophenones, which may generally be added in amounts of up to 1% by weight.

Lubricants and mold release agents, which may generally be added in an amount of up to 1% by weight of the thermoplastic material, are for example stearic acid, stearyl alcohol, alkyl stearates and stearamides, and also esters of pentaerythritol with long-chain fatty acids. Suitable dyes are organic dyes, for example anthraquinone red, organic pigments and lakes such as phthalocyanine blue, inorganic pigments such as titanium dioxide and cadmium sulfide. As plasticizers there may for example be mentioned dioctyl phthalate, dibenzyl phthalate and butylbenzyl phthalate.

As flameproofing agents, there may for example be added a phosphorus-containing compound in amounts of from 1 to 40, preferably from 10 to 30%.by weight.

Such flameproofing agents are for example organic phosphorus compounds such as the esters of phosphoric acid, phosphorous acid and phosphonic and phosphinic acid, and also tertiary phosphines and phosphine oxides. Triphenylphosphine oxide may be mentioned by way of example.

Suitable flameproofing agents also include those compounds containing phosphorus-nitrogen bonds, such as phosphonitrile chloride, phosphoramidates phosphoramides, phosphinamides, tris(aziridinyl)phosphine oxide or tetrakis(hydroxymethyl)phosphonium chloride.

The additives may be introduced at any stage of the preparation, though the stabilizers are expediently added early in order to provide protection at the start of the reaction. In conformity with this, the stabilizers are generally added during the polymerization process, unless they interfere with this process.

The copolymers according to the invention can be processed by conventional methods, for example by injection molding, extrusion or sintering to produce molded articles, films or fibers. Thermoplastically processible molding materials having a high heat resistance can be prepared using the copolymers according to the invention.

EXAMPLES

Preparation of the Copolymers I

The solution viscosity is specified by the viscosity number VN, which is defined as the relative increase in the viscosity of a solvent due to 0.1 to 1.0 g/100 ml of dissolved polymers, divided by the concentration in g/100 ml. The viscosity numbers increase with the degree of polymerization.

$$VN = \left( \frac{\eta}{\eta_0} - 1 \right) \cdot \frac{1}{C}$$

$\frac{\eta}{\eta_0}$

= viscosity ratio where
$\eta$ = viscosity of the polymer solution of defined concentration
$\eta_0$ = viscosity of the solvent
C = concentration of the solution in g/ml.

The glass transition temperature $T_g$ of the polymers is determined by the DSC method (ASTM D 3418-82) on a Mettler DSC-30 apparatus.

Example 1

20 g of N-phenylbicyclo[2.2.1]hept-5-ene-5,6-dicarboxamide, 180 g of methyl methacrylate and 1,800 g of tetrahydrofuran were polymerized for 8 hours at 60° C. under an $N_2$ atmosphere and in the presence of 0.2 g of didodecanoyl peroxide and 0.1 g of tert-butyl perpivalate. The polymer was then precipitated with hexane and dried.

Properties of the product: VN=31, $T_g$=127° C.

Example 2

A mixture of 40 g of N-phenylbicyclo[2.2.1]hept-5-ene-5,6-dicarboxamide, 80 g of methyl methacrylate and 80 g of styrene was polymerized in a manner similar to that described in Example 1. The polymer was then precipitated with hexane and dried.

Properties of the product: VN=30, $T_g$=141° C.

Example 3

A mixture of 20 g of N-cyclohexylbicyclo[2.2.1]-hept-5-ene-5,6-dicarboxamide, and 180 g of methyl methacrylate was polymerized in a manner similar to that described in Example 1. The polymer was then precipitated with hexane and dried.

Properties of the product: VN=28, $T_g$=125° C.

Example 4

A mixture of 40 g of N-cyclohexylbicyclo[2.2.1]-hept-5-ene-5,6-dicarboxamide, 80 g of methyl methacrylate and 80 g of styrene were polymerized in a manner similar to that described in Example 3. The polymer was then precipitated with hexane and dried.

Properties of the product: VN=29, $T_g$=131° C.

Comparative Example 1

200 g of methyl methacrylate in 1,800 g of tetrahydrofuran were polymerized in the presence of 0.2 g of didodecanoyl peroxide and 0.1 g of tert-butyl perpivalate, in a manner similar to that described in Example 1.

Properties of the product: VN=31, $T_g$=109° C.

Comparative Example 2

100 g of methyl methacrylate and 100 g of styrene in 1,800 g of tetrahydrofuran were polymerized in the presence of 0.2 g of didodecanoyl peroxide and 0.1 g of tert-butyl perpivalate, in a manner similar to that described in Comparative Example 1.

Properties of the product: VN=26, $T_g$=101° C.

Preparation of the Imidated Copolymers II

Example 5

A mixture of 10 g of the copolymer from Example 1, 10 g of cyclohexylamine and 80 g of N-methylpyrrolidone was heated to the boiling point under nitrogen in a reaction vessel equipped with a packed column. After about 1 hour methanol could be removed from the head of the column, and during the next 6 hours the reaction was controlled so that the temperature at the head of the column did not exceed 70° C. The amine present in excess was then distilled off and the imidated copolymer was precipitated in methanol and afterwards dried.

The characteristics of the product are shown in the table.

Examples 6 to 8, Comparative Examples 3 and 4

10 g of a copolymer or polymer (from Examples 2 to 4 and Comparative Examples 1 and 2) were reacted in each case with 10 g of cyclohexylamine, in a manner similar to that described in Example 5. The product obtained was then worked up as described above.

The characteristics of the product are shown in the table.

TABLE

| | $M_1$[1] (% by weight) | $M_2$[2] (% by weight) | MMA (% by weight) | St (% by weight) | N content[3] (%) | $T_g$ (°C.) |
|---|---|---|---|---|---|---|
| Example | | | | | | |
| 5 | 10 | — | 90 | — | 4.9 | 197 |
| 6 | 20 | — | 40 | 40 | 2.1 | 193 |
| 7 | — | 10 | 90 | — | 4.6 | 188 |
| 8 | — | 20 | 40 | 40 | 1.9 | 168 |
| Comparative Examples | | | | | | |
| 3 | — | — | 100 | — | 5.0 | 171 |
| 4 | — | — | 50 | 50 | 2.2 | 141 |

[1] $M_1$ = N = phenylbicyclo[2.2.1]hept-2-ene-5,6-dicarboxamide
[2] $M_1$ = N = cyclohexylbicyclo[2.2.1]hept-2-ene-5,6-dicarboxamide
[3] N-content from elementary analysis after the imidation

We claim:

1. A copolymer obtained by
   (I) copolymerizing a monomer mixture comprising
      (A) 1 to 98% by weight of a monomer of the formula I

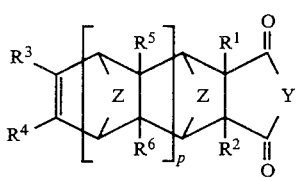

I where:
$R^1$ to $R^6$ are hydrogen, $C_1$-$C_{10}$-alkyl, $C_1$-$C_{10}$-alkoxy, the alkyl or alkoxy radicals having more than one carbon atom optionally have an oxygen atom inserted in either case between two carbon atoms, $C_5$-$C_8$-cycloalkyl, $C_6$-$C_{10}$-aryl, $C_6$-$C_{10}$-aryl-$C_1$-$C_{10}$-alkyl, $C_6$-$C_{10}$-aryloxy, the aryl groups optionally substituted by one to three members selected from the group consisting of $C_1$-$C_{10}$-alkyl, cyano, halogen, —CO—O—$R^7$, —O—CO—$R^7$ or —CO—N$R^7R^8$, where
$R^7$ and $R^8$ are hydrogen, $C_1$-$C_{10}$-alkyl, $C_5$-$C_8$-cycloalkyl, $C_6$-$C_{10}$-aryl or $C_6$-$C_{10}$-aryl-$C_1$-$C_{10}$-alkyl, the aryl groups optionally substituted by one up to three $C_1$-$C_{10}$-alkyl groups
p is 0, 1 or 2;
Z is —$CH_2$—, oxygen or sulfur, the radicals Z being identical or different in the case p>0;
Y is oxygen or —N—$R^9$, where $R^9$ is hydrogen, $C_1$-$C_{22}$-alkyl, $C_5$-$C_{12}$-cycloalkyl, $C_6$-$C_{10}$-aryl or $C_6$-$C_{10}$-aryl-$C_1$-$C_{10}$-alkyl, these radicals, with the exception of hydrogen and $C_1$-$C_{22}$-alkyl, being optionally substituted by one to three radicals selected from the group consisting of $C_1$-$C_4$-alkyl, $C_1$-$C_4$-alkoxy and halogen;

(B) 1 to 98% by weight of at least one compound selected from the group consisting of acrylic and methacrylic acid and esters of the acrylic and methacrylic acid of the formula II $$CH_2=C(R^{10})-COOR^9 \qquad \text{II}$$

where $R^{10}$ is hydrogen or methyl, and
(C) 0 to 98% by weight of at least one further copolymerizable monomer,
and
(II) reacting the thus obtained copolymer with a compound of the formula II $$R^1NH_2 \qquad \text{III}$$

where $R^{11}$ is hydrogen, $C_1$-$C_{22}$-alkyl, $C_5$-$C_8$-cycloalkyl, $C_6$-$C_{10}$-aryl or $C_6$-$C_{10}$-aryl-$C_1$-$C_4$-alkyl, these radicals, with the exception of hydrogen and the $C_1$-$C_{22}$-alkyl radicals, being optionally mono to trisubstituted by radicals selected from the group consisting of $C_1$-$C_4$-alkyl, $C_1$-$C_4$-alkoxy and halogen, or a mixture thereof.

2. A process for preparing a copolymer as claimed in claim 1, which comprises
(I) copolymerizing a monomer mixture comprising
   (A) 1 to 98% by weight of a monomer of the formula I

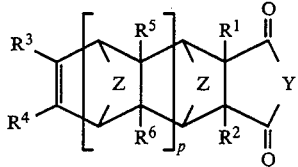

where:
R¹ to R⁶ are hydrogen, $C_1$-$C_{10}$-alkyl, $C_1$-$C_{10}$-alkoxy, the alkyl or alkoxy radicals having more than one carbon atom optionally have an oxygen atom inserted in either case between two carbon atoms, $C_5$-$C_8$-cycloalkyl, $C_6$-$C_{10}$-aryl, $C_6$-$C_{10}$-aryl-$C_1$-$C_{10}$-alkyl, $C_6$-$C_{10}$-aryloxy, the aryl groups being optionally substituted by up to three members selected from the group consisting of $C_1$-$C_{10}$-alkyl, cyano, halogen, —CO—O—R⁷, —O—CO—R⁷ or —CO—NR⁷R⁸, where R⁷ and R⁸ are hydrogen, $C_1$-$C_{10}$-alkyl, $C_5$-$C_8$-cycloalkyl, $C_6$-$C_{10}$-aryl or $C_6$-$C_{10}$-aryl-$C_1$-$C_{10}$-alkyl, the aryl groups being optionally substituted by up to three $C_1$-$C_{10}$-alkyl groups;

p is 0, 1 or 2;

Z is —CH₂—, oxygen or sulfur, the radicals Z being identical or different in the case p>0;

Y is oxygen or —N—R⁹, where R⁹ is hydrogen, $C_1$-$C_{22}$-alkyl, $C_5$-$C_{12}$-cycloalkyl, $C_6$-$C_{10}$-aryl or $C_6$-$C_{10}$-aryl-$C_1$-$C_{10}$-alkyl, these radicals, with the exception of hydrogen and $C_1$-$C_{22}$-alkyl, optionally mono- to trisubstituted by radicals selected from the group consisting of $C_1$-$C_4$-alkyl, $C_1$-$C_4$-alkoxy and halogen;

(B) 1 to 98% by weight of at least one compound selected from the group consisting of acrylic and methacrylic acid and esters of the acrylic and methacrylic acid of the formula II

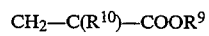

where R¹⁰ is hydrogen or methyl, and (C) 0 to 98% by weight of at least one further copolymerizable monomer, and (II) reacting the thus obtained copolymer with a compound of the formula III

where R¹¹ is hydrogen, $C_1$-$C_{22}$-alkyl, $C_5$-$C_8$-cycloalkyl, $C_6$-$C_{10}$-aryl or $C_6$-$C_{10}$-aryl-$C_1$-$C_4$-alkyl, these radicals, with the exception of hydrogen and the $C_1$-$C_{22}$-alkyl radicals, optionally mono to trisubstituted by radicals selected from the group consisting of $C_1$-$C_4$-alkyl, $C_1$-$C_4$-alkoxy and halogen, or a mixture thereof.

3. A molded article, film or fiber produced from a polymer as claimed in claim 1 or obtained as claimed in claim 2.

* * * * *

UNITED STATES PATENT AND TRADEMARK OFFICE
CERTIFICATE OF CORRECTION

PATENT NO.: 5,354,814

DATED: October 11, 1994

INVENTOR(S): BESECKE et al.

It is certified that error appears in the above-identified patent and that said Letters Patent is hereby corrected as shown below:

IN THE CLAIMS

Claim 1, column 12, line 54:
    "formula II" should read  -- formula III --

Claim 1, column 12, line 55:
    "$R^1NH_2$" should read  -- $R^{11}NH_2$ --

Claim 2, column 14, line 19,
    "$R^1NH_2$" should read  -- $R^{11}NH_2$ --

Signed and Sealed this

Twentieth Day of December, 1994

*Attest:*

BRUCE LEHMAN

*Attesting Officer*     *Commissioner of Patents and Trademarks*